April 1, 1930.  H. ADAMS  1,752,410
BARGE COAL LOADING APPARATUS
Filed April 6, 1927
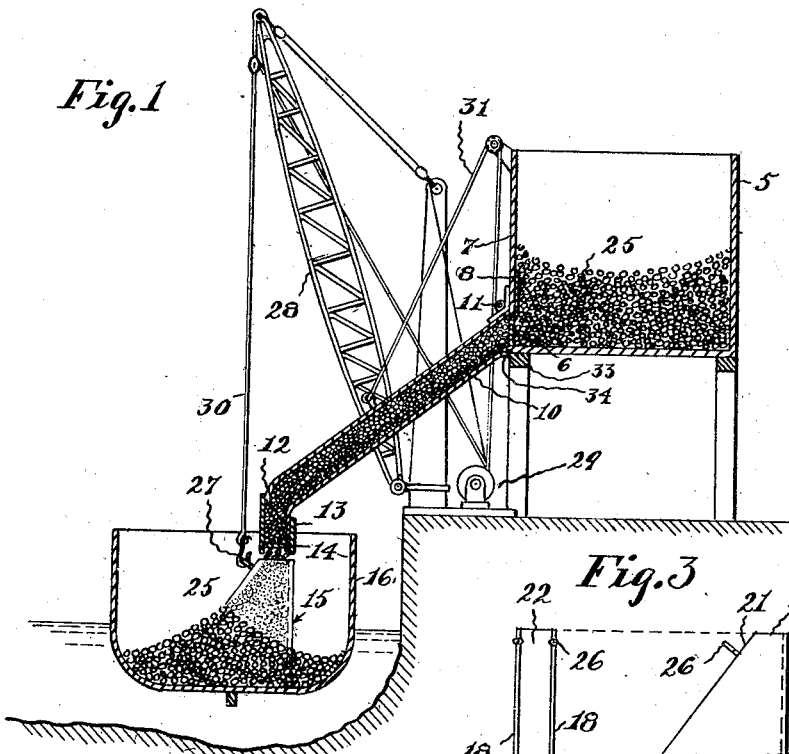
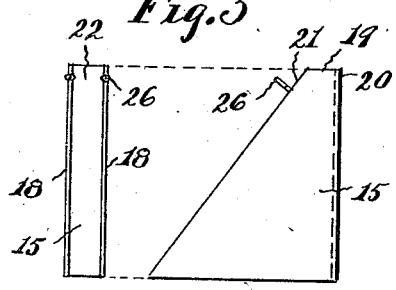
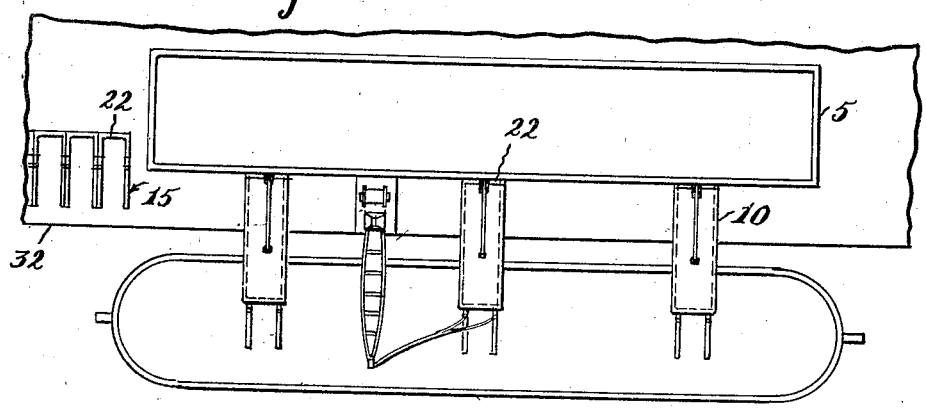
INVENTOR
Henry Adams,
BY
Harold D. Penney, ATTORNEY Patented Apr. 1, 1930

1,752,410

UNITED STATES PATENT OFFICE

HENRY ADAMS, OF PLAINFIELD, NEW JERSEY, ASSIGNOR TO ADAMS COAL MACHINERY COMPANY, OF PLAINFIELD, NEW JERSEY, A CORPORATION OF CONNECTICUT

BARGE COAL-LOADING APPARATUS

Application filed April 6, 1927. Serial No. 181,452.

This invention relates to apparatus for loading coal and other friable material into barges and the like, and more particularly to removable means for loading said materials in a way that degradation will be reduced to a minimum, though it is noted that the invention is not limited to fuels or friable materials, nor in some respects even to loading.

The object of the invention is to provide an apparatus of this kind which may be easily lowered into the barge or the like, which will load without dropping the material any substantial distance, thereby reducing degradation to a minimum, and which may be easily removed from the material after the loading is complete.

Another object of this invention is to provide an apparatus to carry out this operation which is simple, inexpensive, and easy to operate.

Coal when loaded into boats under most methods today is allowed to drop from the loading chute to the bottom of the boat, causing excessive breakage.

Some loading plants have chutes which continually get out of order and are difficult to operate; other plants have belt conveyors which are expensive to build and not easy to operate, and permit a fall of three feet or more.

The chute herein described is simple and inexpensive, operates easily and reliably and requires no extra care to keep it in order, and if operated properly will not allow the material to fall any appreciable distance.

Another object of the invention is to provide an apparatus or device of this kind which will be substantially automatic in its action as the material piles up in the boat or the like.

Other objects of the invention are to improve generally the simplicity and efficiency of such apparatus and to provide an apparatus of this kind which is rapid, durable and reliable in operation, and very economical to construct.

Still other objects of the invention will appear as the description proceeds; and while herein details of the invention are described and claimed, the invention is not limited to these, since many and various changes may be made without departing from the scope of the invention as claimed in the broader claims.

The inventive features for the accomplishment of these and other objects are shown herein in connection with an improved loading apparatus which, briefly stated, includes a delivery chute and a loading chute.

The loading chute is adapted to be lowered into a barge or hoisted therefrom by suitable hoisting means and comprises spaced substantially triangular side walls each having a vertical edge and a slanting edge and an end wall joining said vertical edges to form a narrow enclosure open at the bottom and said slanting edge.

The delivery chute is movable and has a discharge section disposable over the highest part of said enclosure for discharging material into the loading chute wherein it avalanches into the barge and over said edges. When the barge is loaded, the loading chute is hoisted out, the material therein passing freely out at said open bottom.

In the accompanying drawing, showing by way of example, one of many possible embodiments of the invention, Fig. 1 is a transverse vertical sectional view, partly in elevation, showing the chutes in operation filling a barge;

Fig. 2 is a plan showing the apparatus as in Fig. 1; and

Fig. 3 shows side and end elevations of the loading chute.

My improved apparatus is shown in combination with a storage bin or pocket 5 having a delivery opening 6 in its front wall 7 provided with a slide door 8. An inclined delivery chute 10 hinged at its uppermost point 11 to said bin communicates, when in lowest inclined position, with the delivery opening 6 and has its discharge end 12 downwardly directed. A discharge section 13 suitably pivotally vertically suspended on said discharge end in all positions of the chute is provided with a transverse slide gate 14 at its lower end.

A loading chute 15 adapted to be lowered into a barge 16, car or the like comprises a pair of approximately triangular spaced side walls 18 (Fig. 3) of greater height than width, and each horizontally cut off at the upper part 19 and having a vertical edge 20, and a slanting edge 21 inclined to its horizontal base at an angle, which is somewhat greater than the angle of repose of the material. A narrow end wall 22 joins said vertical edges to form a narrow approximately triangularly-shaped enclosure truncated at its top and open at the bottom and at said slanting edges and adapted to rest on the bottom of the barge with said truncated part 19 under the discharge section 14.

Said loading chute serves to confine the coal or other material 25 in a narrow upstanding triangular enclosure, open at one side, wherein said material piles up in a triangular pile until it meets the material in the discharge section thereby forming a solid body of material held against falling and degradation, the material avalanching over said outer part of the pile to assume a natural angle of repose on the unconfined side of the pile at the open side of the loading chute, thereby releasing the material in all directions at the lower part of said slanting edges and then gradually up said edges nearer said discharge section as the pile builds up to permit the material to avalanche freely in all directions until the barge is substantially loaded.

A pair of eyes 26 secured to said slanting edges at the median transverse plane of gravity of the loading chute receive hooks 27 from a hoisting means including a crane 28, a motor 29 and cables 30, 31 one of which, 30, is provided with the hooks 27 engageable with said eyes for hoisting said loading chute from the material of the loaded barge and placing the chute, for instance, on the dock 32 leaving the material therein in the barge, because of said open bottom, and depositing the chute to one side. Another of said cables, the cable 31, is connected to the delivery chute 10 for raising it out of the way for lowering or hoisting the loading chute, or for adjusting it to the height of the tide, overlapping lips 33, 34 respectively at the lower part of the opening 6 and the lower part of the upper end opening of the chute 10, serving to prevent the leakage of material when the chute 10 is slightly raised for high tide.

I claim as my invention:

1. An upwardly tapering trapezoidal loading chute, having thereon a means for connecting the same to a hoisting mechanism, thereby being adapted to be lowered and hoisted, said chute comprising vertical side walls, forming a narrow enclosure which is open at the bottom and one side thereof; and a means for rigidly connecting said side walls to each other.

2. An upwardly tapering loading chute, having thereon a means for connecting the same to a hoisting mechanism, thereby being adapted to be lowered and hoisted, said chute comprising spaced vertical side walls, having thereon each a slanting edge, and forming a narrow enclosure, which is open at the bottom and one side thereof, said connecting means being positioned at said slanting edges, said chute to be hoisted from the material surrounding and filling the same during the operation of loading, thereby leaving said material beneath it.

3. An upwardly tapering loading chute, having thereon a means for connecting the same to a hoisting mechanism, thereby being adapted to be lowered and hoisted, said chute comprising side walls, having thereon each a vertical edge and a slanting edge, and forming an enclosure, which is open at the bottom and the side at said slanting edges, said connecting means being positioned at said slanting edges, and a wall joining said vertical edges.

4. An upwardly tapering loading chute, having thereon a means for connecting the same to a hoisting mechanism, thereby being adapted to be lowered and hoisted, and comprising substantially trapezoidal shaped side walls, having thereon each a vertical edge and a slanting edge, the latter forming with its base an angle, which is greater than the angle of repose of the material loaded by said chute, and a wall joining said vertical edges, thereby forming an enclosure, which is open at the bottom thereof.

5. A loading chute adapted to be lowered into a barge, or car and comprising a pair of approximately triangular spaced side walls of greater height than width, and each horizontally cut off at the upper part and having a vertical edge, and a slanting edge somewhat greater than the angle of repose of the material, and a narrow end wall joining said vertical edges to form a narrow approximately triangularly shaped enclosure truncated at its top and open at the bottom and at said side edges and adapted to rest on the bottom of the barge with said truncated part under the discharge end of a chute and its least tall part disposed a distance to one side thereof; and a pair of eyes secured to said slanting edges of the loading chute.

6. In combination, a storage bin, an upwardly tapered loading chute having thereon a means for connecting the same to a hoisting mechanism, thereby being adapted to be lowered and hoisted and comprising side walls each having a vertical edge and a slanting edge and a wall joining said vertical edges to form an enclosure open at the bottom and said slanting edge; and a movable delivery chute hingedly connected at the upper end thereof to said bin and having a discharge section disposable over the highest part of said enclosure, said enclosure being adapted to be hoisted from material when surrounded and filled with material, the material being left behind when said enclosure is hoisted.

7. In combination, a storage bin having a delivery chute hingedly connected at the upper end thereof to said bin and having at the lower end thereof a downwardly directed discharge opening; a discharge section pivotally vertically suspended on the discharge end of the chute and provided with a gate; and an upwardly tapered loading chute having thereon a means for connecting the same to a hoisting mechanism, thereby being adapted to be lowered into a barge and positioned with its upper end under said discharge section, and comprising spaced side walls and an end wall forming an enclosure open at one edge; the material piling up in said enclosure until it retards the material in said section and the hinged chute, the material avalanching to assume a natural angle of repose in said enclosure and surround the latter.

8. In combination, a storage bin, an upwardly tapered loading chute adapted to be lowered into a barge and comprising side walls each having a vertical edge and a slanting edge and a wall joining said vertical edges to form an enclosure open at the bottom and said slanting edges; a movable delivery chute hingedly connected at the upper end thereof to said bin and having a discharge section pivotally vertically suspended at the lower end thereof and disposable over the highest part of said enclosure; eyes on said slanting edges; and a hoisting means including a crane, a motor and cables, one of which is provided with hooks engageable with said eyes for lowering said loading chute into a barge and for hoisting said loading chute from the material of the loaded barge, leaving the material therein in the barge, because of said open bottom, another of said cables being connected to the delivery chute for raising it out of the way for lowering or hoisting the loading chute.

Signed at Plainfield in the county of Union and State of New Jersey this 1st day of April A. D. 1927.

HENRY ADAMS.